(12) United States Patent
Morisaki (10) Patent No.: US 10,189,477 B2
(45) Date of Patent: Jan. 29, 2019

(54) HYBRID VEHICLE

(71) Applicant: TOYOTA JIDOSHA KABUSHIKI KAISHA, Toyota-shi, Aichi-ken (JP)

(72) Inventor: Keisuke Morisaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/801,484

(22) Filed: Nov. 2, 2017

(65) Prior Publication Data

US 2018/0148059 A1  May 31, 2018

(30) Foreign Application Priority Data

Nov. 29, 2016 (JP) ................. 2016-231279

(51) Int. Cl.
| | | |
|---|---|---|
| *B60L 7/18* | (2006.01) | |
| *B60W 30/18* | (2012.01) | |
| *B60L 11/18* | (2006.01) | |

(52) U.S. Cl.
CPC ......... *B60W 30/18127* (2013.01); *B60L 7/18* (2013.01); *B60L 11/1862* (2013.01); *B60W 30/18136* (2013.01); *B60W 2510/18* (2013.01)

(58) Field of Classification Search
None
See application file for complete search history.

(56) References Cited

U.S. PATENT DOCUMENTS

2013/0261865 A1* 10/2013 Toki ................... B60K 6/48
 701/22
2015/0202966 A1  7/2015 Oyama et al.
2015/0258897 A1  9/2015 Okada et al.

FOREIGN PATENT DOCUMENTS

| JP | 2002-027681 A | 1/2002 |
|---|---|---|
| JP | 2007-124750 | 5/2007 |
| JP | 2007-204004 A | 8/2007 |
| JP | 2014-050195 A | 3/2014 |
| JP | 2014-79095 | 5/2014 |

\* cited by examiner

*Primary Examiner* — John D Walters
*Assistant Examiner* — Hilary L Johns
(74) *Attorney, Agent, or Firm* — Finnegan, Henderson, Farabow, Garrett & Dunner, LLP (57) ABSTRACT

In a hybrid vehicle including an engine, an electric motor configured to give braking force to the vehicle, a battery configured to exchange electric power with the electric motor, a hydraulic brake configured to give braking force to the vehicle, and an electronic control unit configured to execute regeneration cooperative control such that braking force is given from the engine, the electric motor, and the hydraulic brake to the vehicle based on a driver's brake-on operation, when an open end voltage of the battery is equal to or greater than a first predetermined voltage, the regeneration cooperative control is limited.

12 Claims, 8 Drawing Sheets

HYBRID VEHICLE

INCORPORATION BY REFERENCE

The disclosure of Japanese Patent Application No. 2016-231279 filed on Nov. 29, 2016 including the specification, drawings and abstract is incorporated herein by reference in its entirety.

BACKGROUND

1. Technical Field

The present disclosure relates to a hybrid vehicle, and in particular, to a hybrid vehicle that executes regeneration cooperative control for giving braking force from an engine, an electric motor, and a hydraulic brake to the vehicle.

2. Description of Related Art

As the related art, a technique that estimates internal pressure of a battery through calculation, and when the estimated internal pressure is higher than charging inhibition internal pressure set to be lower than valve open pressure of a safety valve, inhibits charging of the battery has been suggested (for example, see Japanese Unexamined Patent Application Publication No. 2007-124750 (JP 2007-124750 A)). With this, a situation in which the safety valve is opened due to an increase in internal pressure, and electrical characteristics of the battery are degraded due to discharge of an electrolyte solution or the like is suppressed.

SUMMARY

In a case where the above-described technique is applied to a battery of a drive system of a hybrid vehicle, charging of the battery is inhibited in a case of a driver's brake-on operation, the engine may be increased in speed, and an occupant may feel a sense of discomfort, causing degradation of drivability. Even if charging of the battery is inhibited, since discharging from the battery is not inhibited, an over-discharge state is brought, a discharge allowance of the battery decreases, smooth drive control cannot be performed, and drivability is degraded.

The disclosure provides a hybrid vehicle that suppresses degradation of drivability.

An aspect relates to a hybrid vehicle including an engine, an electric motor, a battery, a hydraulic brake, and an electronic control unit. The electric motor is configured to give braking force to the vehicle. The battery is configured to exchange electric power with the electric motor. The hydraulic brake is configured to give braking force to the vehicle. The electronic control unit is configured to execute regeneration cooperative control such that braking force is given from the engine, the electric motor, and the hydraulic brake to the vehicle based on a driver's brake-on operation. The electronic control unit is configured to limit the regeneration cooperative control when an open end voltage of the battery is equal to or greater than a first predetermined voltage.

According to the aspect, the regeneration cooperative control is executed such that braking force is given from the engine, the electric motor, and the hydraulic brake to the vehicle based on the driver's brake-on operation. The regeneration cooperative control means control for cooperatively applying an engine brake, regenerative torque by regenerative control of the electric motor, and braking force by the hydraulic brake. Then, when the open end voltage of the battery is equal to or greater than the first predetermined voltage, the regeneration cooperative control is limited. The limitation of the regeneration cooperative control may include decreasing the regenerative torque by the regenerative control of the electric motor and increasing the braking force of the hydraulic brake by the decrease amount. The limitation of the regeneration cooperative control may further include decreasing the application of the engine brake and increasing the braking force of the hydraulic brake by the decrease amount. Accordingly, when the open end voltage of the battery is equal to or greater than the first predetermined voltage, the regeneration cooperative control is limited, whereby it is possible to suppress charging of the battery and to suppress a further increase in the open end voltage of the battery. Since the engine brake is identical but is applied a little, it is possible to suppress an increase in speed of the engine. As a result, it is possible to suppress degradation of drivability.

In the hybrid vehicle according to the aspect, the electronic control unit may be configured to inhibit the regeneration cooperative control as limitation of the regeneration cooperative control.

According to the aspect, the inhibition of the regeneration cooperative control includes inhibiting the regenerative control of the electric motor and outputting regenerative torque for the inhibition amount from the hydraulic brake as braking force. The inhibition of the regeneration cooperative control may further include inhibiting the engine brake and outputting braking three for the inhibition amount from the hydraulic brake as braking force. With this, it is possible to strongly suppress charging of the battery and to suppress a further increase in the open end voltage of the battery.

In the hybrid vehicle according to the aspect, the electronic control unit may be configured to release limitation of the regeneration cooperative control after the open end voltage becomes less than a second predetermined voltage lower than the first predetermined voltage when the regeneration cooperative control is limited.

According to the aspect, it is possible to suppress the frequent occurrence of the limitation and release of the regeneration cooperative control.

In the hybrid vehicle according to the aspect, the electronic control nit may be configured to release limitation of the regeneration cooperative control after brake-off when releasing the limitation of the regeneration cooperative control.

According to the aspect, the limitation of the regeneration cooperative control is released in the brake-on state, whereby there is no need to perform processing for switching a part of the braking force of the hydraulic brake to regenerative torque by the regenerative control of the electric motor. In addition, it is possible to suppress torque shock that may occur in a case of such switching.

In the hybrid vehicle according to the aspect, the first predetermined voltage may have a smaller value when a temperature of the battery is higher.

According to the aspect, since the gas generation speed in the battery becomes higher when the temperature of the battery is higher, the first predetermined voltage is changed according to the temperature of the battery, and thereby it is possible to more suitably perform the limitation of the regeneration cooperative control.

In the hybrid vehicle according to the aspect, the electronic control unit may be configured to limit the regeneration cooperative control when the open end voltage becomes equal to or greater than the first predetermined voltage and internal pressure of the battery is equal to or greater than predetermined internal pressure.

According to the aspect, since the internal pressure of the battery is considered, it is possible to more suitably perform the limitation of the regeneration cooperative control.

In the hybrid vehicle according to the aspect, the electronic control unit may be configured to decrease another braking force according to an increase rate in braking force of the hydraulic brake in a case of limiting the regeneration cooperative control.

According to the aspect, it is possible to suppress the occurrence of torque shock at the time of the limitation of the regeneration cooperative control and to suppress degradation of drivability.

In the hybrid vehicle according to the aspect, the electronic control unit may be configured to limit the regeneration cooperative control by performing switching of braking force to the vehicle such that the braking force given by the electric motor decreases and the braking force given by the hydraulic brake increases by a decrease amount of the braking force given by the electric motor.

In the hybrid vehicle according to the aspect, the electronic control unit may be configured to limit the regeneration cooperative control by performing switching of braking force to the vehicle such that the braking force given by an engine brake of the engine decreases and the braking force given by the hydraulic brake increases by a decrease amount of the braking force given by the engine brake.

In the hybrid vehicle according to the aspect, the electronic control unit may be configured to, in a case where the regeneration cooperative control is limited, set a rate of switching the braking force to be lower than in a case where the regeneration cooperative control is not limited.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Next, a mode for carrying out the embodiment will be described in connection with an example.

Figure 1:
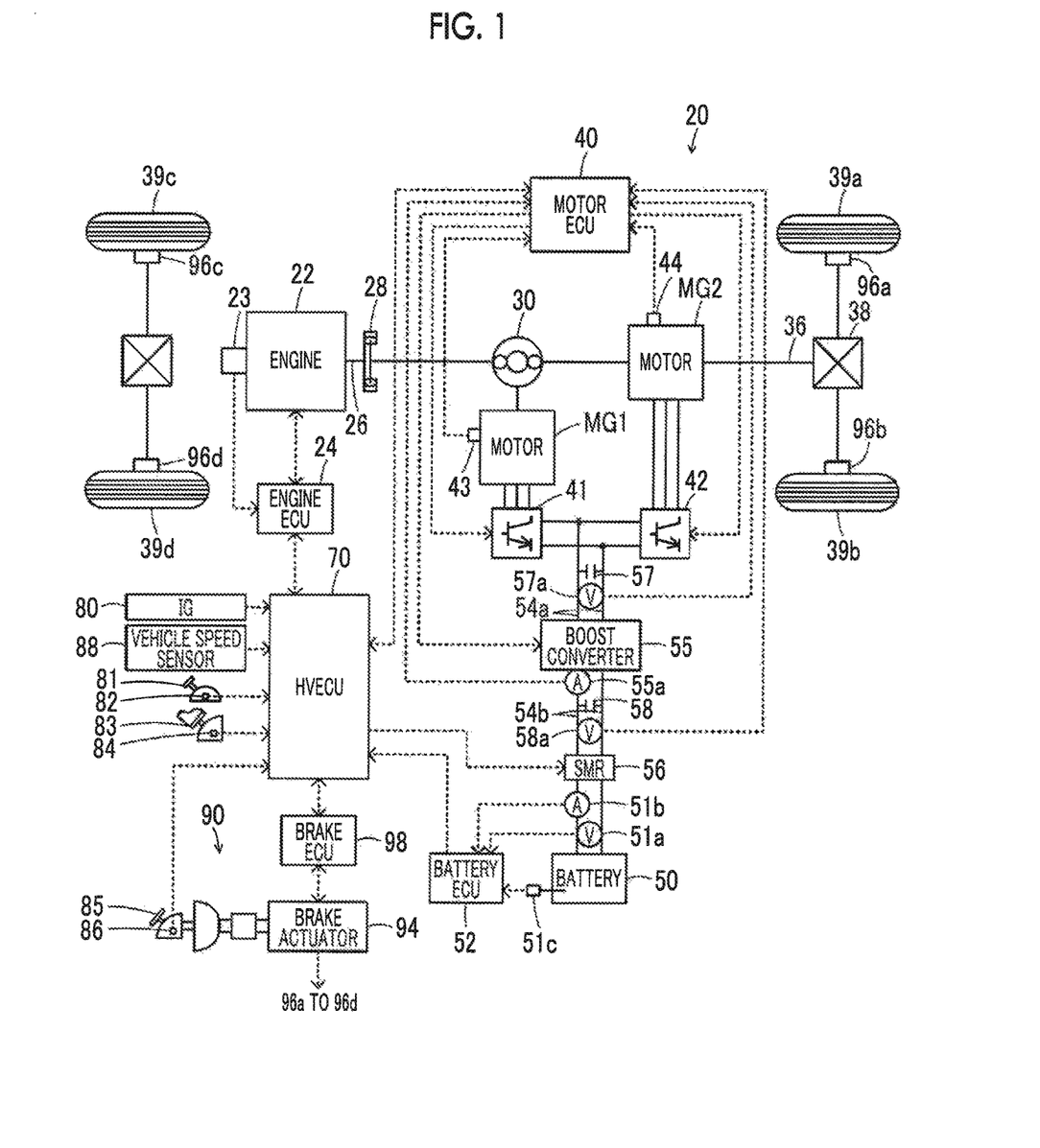
FIG. 1 is a configuration diagram showing the outline of the configuration of a hybrid vehicle of an example.
Figure 2:
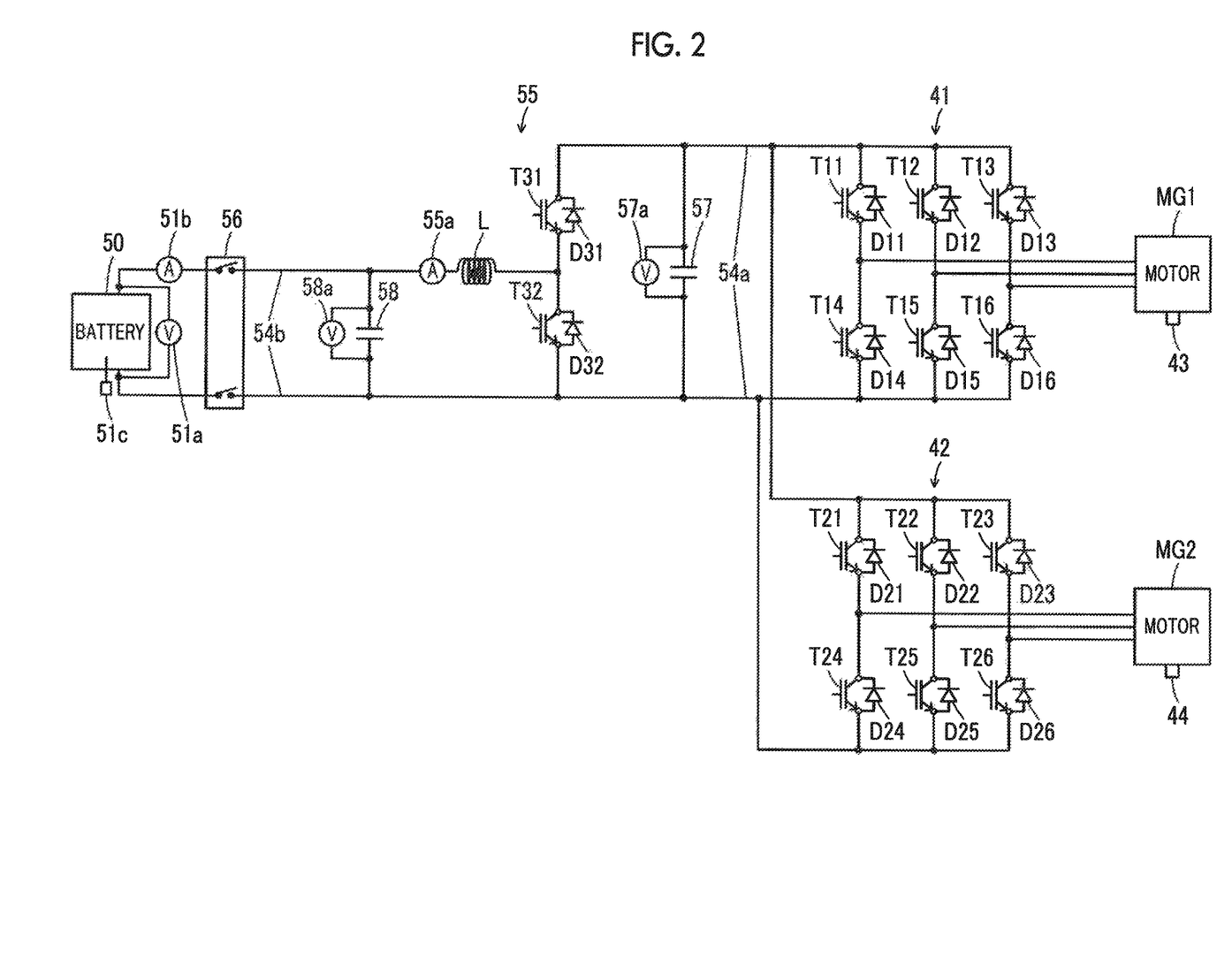
FIG. 2 is a configuration diagram showing the outline of the configuration of an electric machine drive system including a motor.

FIG. 1 is a configuration diagram showing the outline of the configuration of a hybrid vehicle 20 as an example, and FIG. 2 is a configuration diagram showing the outline of the configuration of an electric machine drive system including motors MG1, MG2. As shown in FIG. 1, the hybrid vehicle 20 of the example includes an engine 22, a planetary gear 30, motors MG1, MG2, inverters 41, 42, a battery 50, a boost converter 55, a system main relay 56, a hydraulic brake device 90, and an electronic control unit for hybrid (hereinafter, referred to as an "HVECU") 70.

The engine 22 is constituted as an internal combustion engine that outputs power with gasoline, diesel, or the like as fuel. The operation of the engine 22 is controlled by an electronic control unit for an engine (hereinafter, referred to as an "engine ECU") 24.

Though not shown, the engine ECU 24 is constituted as a microprocessor centering on a CPU, and includes, in addition to the CPU, a ROM that stores a processing program, a RAM that temporarily stores data, an input/output port, and a communication port. Signals from various sensors for controlling the operation of the engine 22, for example, a crank angle θcr from a crank position sensor 23 that detects a rotation position of a crankshaft 26 of the engine 22, and the like are input to the engine ECU 24 through the input port. Various control signals for controlling the operation of the engine 22 are output from the engine ECU 24 through the output port. The engine ECU 24 is connected to the HVECU 70 through the communication port. The engine ECU 24 calculates a rotation speed Ne of the engine 22 based on the crank angle θcr from the crank position sensor 23.

The planetary gear 30 is constituted as a single-pinion type planetary gear mechanism. A rotor of the motor MG1 is connected to a sun gear of the planetary gear 30. A drive shaft 36 coupled to drive wheels 39a, 39b through a differential gear 38 is connected to a ring gear of the planetary gear 30. The crankshaft 26 of the engine 22 is connected to a carrier of the planetary gear 30 through a damper 28.

The motor MG1 is constituted as a synchronous motor generator having a rotor embedded with a permanent magnet and a stator wound with three-phase coils, and as described above, the rotor is connected to the sun gear of the planetary gear 30. Similarly to the motor MG1, the motor MG2 is constituted as a synchronous motor generator having a rotor embedded with a permanent magnet and a stator wound with three-phase coils, and the rotor is connected to the drive shaft 36.

As shown in FIG. 2, the inverter 41 is connected to a high voltage side electric power line 54a. The inverter 41 has six transistors T11 to T16, and six diodes D11 to D16 connected reversely in parallel with the transistors T11 to T16. The transistors T11 to T16 are disposed in pairs so as to become a source side and a sink side with respect to a positive electrode side line and a negative electrode side line of the high voltage side electric power line 54a. The three-phase coils (U-phase, V-phase, and W-phase) of the motor MG1 are connected to connection points between the paired transistors of the transistors T11 to T16, respectively. Accordingly, when a voltage is applied to the inverter 41, the ratio of the on time of the paired transistors of the transistors T11 to T16 is adjusted by an electronic control unit for a motor (hereinafter, referred to as a "motor ECU") 40, whereby a rotating magnetic field is formed in the three-phase coils, and the motor MG1 is rotationally driven. Similarly to the inverter 41, the inverter 42 is connected to the high voltage side electric power line 54a, and has six transistors T21 to T26 and six diodes D21 to D26. Then, when a voltage is applied to the inverter 42, the ratio of the on time of the paired transistors of the transistors T21 to T26 is adjusted by the motor ECU 40, whereby a rotating magnetic field is formed in the three-phase coils, and the motor MG2 is rotationally driven.

The boost converter 55 is connected to the high voltage side electric power line 54a to which the inverters 41, 42 are connected, and a low voltage side electric power line 54b to which the battery 50 is connected. The boost converter 55 has two transistors T31, T32, two diodes D31, D32 connected reversely in parallel with the transistors T31, T32, and a reactor L. The transistor T31 is connected to the positive electrode side line of the high voltage side electric power line 54a. The transistor T32 is connected to the transistor T31 and negative electrode side lines of the high voltage side electric power line 54a and the low voltage side electric power line 54b. The reactor L is connected to a connection point between the transistors T31, T32 and a positive electrode side line of the low voltage side electric power line 54b. The ratio of the on time of the transistors T31, T32 is adjusted by the motor ECU 40, whereby the boost converter 55 boosts electric power of the low voltage side electric power line 54b and supplies the electric power to the high voltage side electric power line 54a, or deboosts electric power of the high voltage side electric power line 54a and supplies the electric power to the low voltage side electric power line 54b. A smoothing capacitor 57 is attached to the positive electrode side line and the negative electrode side line of the high voltage side electric power line 54a, and a smoothing capacitor 58 is attached to the positive electrode side line and the negative electrode side line of the low voltage side electric power line 54b.

Though not shown, the motor ECU 40 is constituted as a microprocessor centering on a CPU, and includes, in addition to the CPU, a ROM that stores a processing program, a RAM that temporarily stores data, an input/output port, and a communication port. As shown in FIG. 1, signals from various sensors for controlling the drive of the motors MG1, MG2 or the boost converter 55 are input to the motor ECU 40 through the input port. As the signals that are input to the motor ECU 40, for example, rotation positions $\theta m1$, $\theta m2$ from rotation position detection sensors (for example, resolvers) 43, 44 that detect rotation positions of the rotors of the motors MG1, MG2, and phase currents Iu1, Iv1, Iu2, Iv2 from current sensors (not shown) that detect currents flowing in the phases of the motors MG1, MG2 can be exemplified. In addition, a voltage (a voltage (high voltage side voltage) of the high voltage side electric power line 54a) VH of the capacitor 57 from a voltage sensor 57a attached between the terminals of the capacitor 57, a voltage (a voltage (low voltage side voltage) of the low voltage side electric power line 54b) VL of the capacitor 58 from a voltage sensor 58a attached between the terminals of the capacitor 58, and a current (reactor current) IL flowing in the reactor L from a current sensor 55a attached to a terminal of the reactor L can be exemplified. A switching control signal to the transistors T11 to T16, T21 to T26 of the inverters 41, 42, a switching control signal to the transistors T31, T32 of the boost converter 55, and the like are output from the motor ECU 40 through the output port. The motor ECU 40 is connected to the HVECU 70 through the communication port. The motor ECU 40 calculates electric angles $\theta e1$, $\theta e2$ and rotation speeds Nm1, Nm2 of the motors MG1, MG2 based on the rotation positions $\theta m1$, $\theta m2$ of the rotors of the motors MG1, MG2 from the rotation position detection sensors 43, 44.

The battery 50 is constituted as, for example, a nickel-hydrogen secondary battery, and is connected to the low voltage side electric power line 54b. The battery 50 is managed by an electronic control unit for a battery (hereinafter, referred to as a "battery ECU") 52.

Though not shown, the battery ECU 52 is constituted as a microprocessor centering on a CPU, and includes, in addition to the CPU, a ROM that stores a processing program, a RAM that temporarily stores data, an input/output port, and a communication port. Signals from various sensors for managing the battery 50 are input to the battery ECU 52 through the input port. As the signals that are input to the battery ECU 52, for example, a voltage (battery voltage) VB from a voltage sensor 51a provided between the terminals of the battery 50, a current (battery current) IB from a current sensor 51b attached to an output terminal of the battery 50, and a temperature (battery temperature) Tb from a temperature sensor 51c attached to the battery 50 can be exemplified. The battery ECU 52 is connected to the HVECU 70 through the communication port. The battery ECU 52 calculates a state of charge SOC and input and output limits Win, Wout in order to manage the battery 50. The state of charge SOC is the ratio of the capacity of electric power dischargeable from the battery 50 to the total capacity, and is calculated based on an integrated value of a charging and discharging current Ib detected by a current sensor. The input and output limits Win, Wout are maximum allowable electric power in charging and discharging the battery 50, and are calculated based on the calculated state of charge SOC and the battery temperature Tb. The battery ECU 52 calculates an estimated open end voltage OCV or an estimated cell open end voltage OCVc based on the battery voltage VB from the voltage sensor 51a and the battery current IB from the current sensor 51b. The estimated open end voltage OCV can be obtained by Expression (1) in a case where internal resistance of the battery 50 is represented by R and a voltage by polarization of the battery 50 is represented by Vdyn. The internal resistance R is a predetermined initial value of the internal resistance of the battery 50 and is a fixed value that can be obtained by a measurement or calculation in advance. The polarization is voltage fluctuation that dynamically changes according to the charging and discharging history. A polarization voltage Vdrn increases in a minus direction when discharging is continued and increases in a plus direction when charging is continued. The magnitude of the voltage fluctuation by the polarization can be determined according to a past charging and discharging history and the magnitude of the charging and discharging current at this time. The polarization voltage Vdrn can be obtained by Expression (2) in a case where a previous polarization voltage is represented by Vdrn(t−Δt), a current flowing in the battery 50 at time t is represented by I(t), a speed at which the polarization advances is represented by $\tau(I(t))$, and current dependence of the polarization voltage is represented by F(I(t)). In Expression (2), η represents an attenuation factor, Δt represents a calculation time interval, and Δt/τ(I(t)) represents a time constant. The estimated cell open end voltage OCVc is a value obtained by dividing the estimated open end voltage OCV by the number of cells connected in series.

$$OCV = VB + IB \cdot R + Vdyn \quad (1)$$

$$Vdrn(t) = \eta \cdot Vdrn(t-1) + F(I(t)) \times (\Delta t / \tau(I(t))) \quad (2)$$

The system main relay 56 is provided on the battery 50 side from the capacitor 58 in the low voltage side electric power line 54b. The system main relay 56 is controlled to be turned on and off by the HVECU 70, thereby performing connection and disconnection of the battery 50 and the boost converter 55.

The hydraulic brake device 90 includes brake wheel cylinders 96a, 96b, 96c, 96d attached to the drive wheels 39a, 39b and driven wheels 39c, 39d, and a brake actuator 94. The brake actuator 94 is constituted as an actuator that adjusts hydraulic pressure of the brake wheel cylinder 96a, 96b, 96c, 96d to give braking force to the drive wheels 39a, 39b and the driven wheels 39c, 39d. The drive of the brake actuator 94 is controlled by an electronic control unit for a brake (hereinafter, referred to as a "brake ECU") 98.

Though not shown, the brake ECU 98 is constituted as a microprocessor centering on a CPU, and includes, in addition to the CPU, a ROM that stores a processing program, a RAM that temporarily stores data, an input/output port, and a communication port. Signals from various sensors for controlling the drive of the brake actuator 94 are input to the brake ECU 98 through the input port. A drive control signal to the brake actuator 94, and the like are output from the brake ECU 98 through the output port. The brake ECU 98 is connected to the HVECU 70 through the communication port.

Though not shown, the HVECU 70 is constituted as a microprocessor centering on a CPU, and includes, in addition to the CPU, a ROM that stores a processing program, a RAM that temporarily stores data, an input/output port, and a communication port. Signals from various sensors are input to the HVECU 70 through the input port. As the signals that are input to the HVECU 70, for example, an ignition signal from an ignition switch 80, and a shift position SP from a shift position sensor 82 that detects an operation position of a shift lever 81 can be exemplified. In addition, an accelerator operation amount Acc from an accelerator pedal position sensor 84 that detects a depression amount of an accelerator pedal 83, a brake pedal position BP from a brake pedal position sensor 86 that detects a depression amount of a brake pedal 85, and a vehicle speed V from a vehicle speed sensor 88 can be exemplified. The shift position SP includes a parking position (P position), a reverse position (R position), a neutral position (N position), a forward position (D position), and the like. As described above, the HVECU 70 is connected to the engine ECU 24, the motor ECU 40, the battery ECU 52, and the hydraulic brake device 90 through the communication port.

The hybrid vehicle 20 of the example configured as above travels in a hybrid traveling (HV traveling) mode in which traveling is performed with the operation of the engine 22, or in an electrically powered traveling (EV traveling) mode in which traveling is performed without the operation of the engine 22.

In the HV traveling mode, the HVECU 70 sets requested torque Td* requested for traveling (requested for the drive shaft 36) based on the accelerator operation amount Acc and the vehicle speed V, and calculates requested power Pd* requested for traveling (requested for the drive shaft 36) by multiplying the set requested torque Td* by a rotation speed Nd of the drive shaft 36 (the rotation speed Nm2 of the motor MG2). Subsequently, requested power Pe* requested for the vehicle (requested for the engine 22) is set by subtracting requested charging and discharging power Pb* (a positive value when electric power is discharged from the battery 50) based on the state of charge SOC of the battery 50 from the requested power Pd*. Next, a target rotation speed Ne* or target torque Te* of the engine 22 and torque commands Tm1*, Tm2* of the motors MG1, MG2 are set such that the requested power Pe* is output from the engine 22 and the requested torque Td* is output to the drive shaft 36. Subsequently, a target voltage VH* of the high voltage side electric power line 54a (capacitor 57) is set based on the torque commands Tm1*, Tm2* or the rotation speeds Nm1, Nm2 of the motors MG1, MG2. Then, the target rotation speed Ne* or the target torque Te* of the engine 22 is transmitted to the engine ECU 24, and the torque commands Tm1*, Tm2* of the motors MG1, MG2 or the target voltage VH* of the high voltage side electric power line 54a is transmitted to the motor ECU 40. The engine ECU 24 performs intake air amount control, fuel injection control, ignition control, and the like of the engine 22 such that the engine 22 is operated based on the target rotation speed Ne* and the target torque Te*. The motor ECU 40 performs switching control of the transistors T11 to T16, T21 to T26 of the inverters 41, 42 such that the motors MG1, MG2 are driven with the torque commands Tm1*, Tm2*, and performs switching control of the transistors T31, T32 of the boost converter 55 such that the voltage (high voltage side voltage) VH of the high voltage side electric power line 54a becomes the target voltage VH*.

In the EV traveling mode, the HVECU 70 sets the requested torque Td* based on the accelerator operation amount Acc and the vehicle speed V, sets a value of 0 as the torque command Tm1* of the motor MG1, sets the torque command Tm2* of the motor MG2 such that the requested torque Td* is output to the drive shaft 36, and sets the target voltage VH* of the high voltage side electric power line 54a based on the torque commands Tm1*, Tm2* or the rotation speeds Nm1, Nm2 of the motors MG1, MG2. Then, the torque commands Tm1*, Tm2* of the motors MG1, MG2 or the target voltage VH* of the high voltage side electric power line Ma is transmitted to the motor ECU 40. The control of the inverters 41, 42 or the boost converter 55 by the motor ECU 40 has been described above.

Next, the operation of the hybrid vehicle 20 of the example configured as above, in particular, the operation of the regeneration cooperative control at the time of brake-on according to the state of the battery 50 will be described. In the hybrid vehicle 20 of the example, in a case where the driver depresses the brake pedal 85, basically, braking force is applied to the vehicle as follows. First, target braking force Pb* that is applied to the vehicle is set according to the brake pedal position BP from the brake pedal position sensor 86. Next, the torque command Tm2* for braking to be applied from the motor MG2 to the drive shaft 36 is set within a range of the input limit Win of the battery 50 and within a range of target braking torque Td* by converting the target braking force Pb* into torque of the drive shaft 36, sets insufficient braking torque obtained by subtracting the torque command Tm2* from the target braking torque Td* as a target brake command Br* to be applied from the hydraulic brake device 90, controls the drive of the motor MG2 using the torque command Tm2* by the motor ECU 40, and controls the drive of the brake actuator 94 using the target brake command Br* by the brake ECU 98. When the charging of the battery 50 is predicted to be continued due to a comparatively long downward slope or the like or when the state of charge SOC of the battery 50 becomes comparatively large and the input limit Win becomes small, the engine 22 in a state in which fuel injection is stopped is motored by the motor MG1, and a value obtained by subtracting braking torque by the engine brake from the torque command Tm2* to be output from the motor MG2 is set as the torque command Tm2*. In the example, such brake control is referred to as "regeneration cooperative control".

Figure 3:
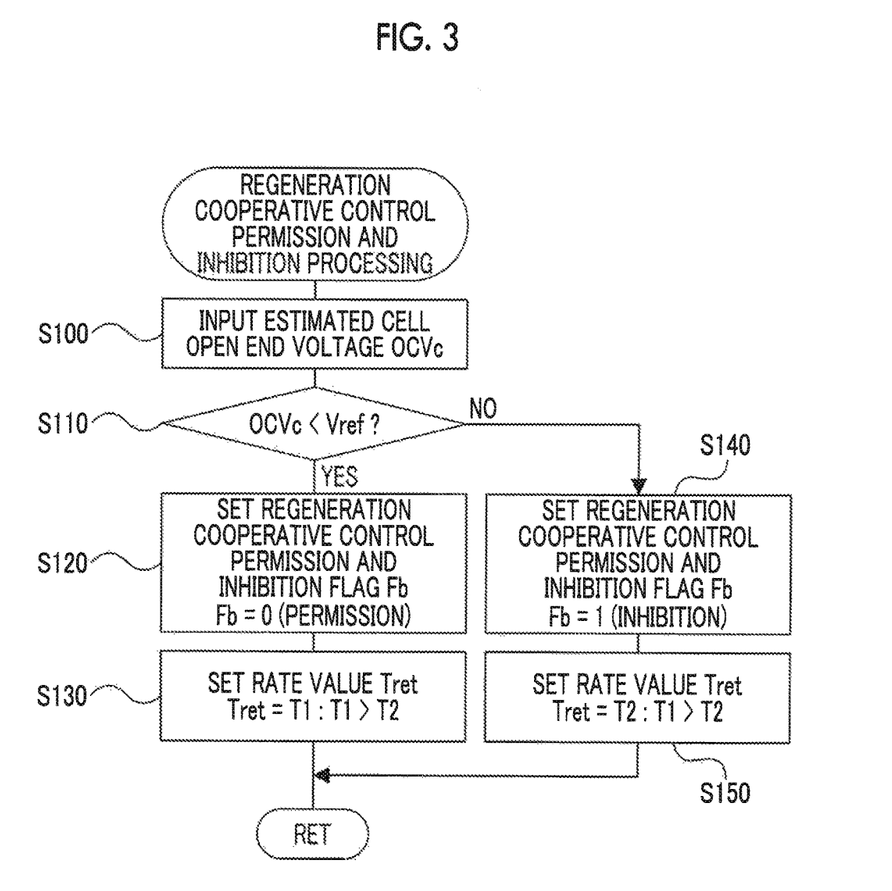
FIG. 3 is a flowchart showing an example of regeneration cooperative control permission and inhibition processing that is executed by an HVECU.

In the example, the regeneration cooperative control is inhibited or permitted according to the state of the battery 50. FIG. 3 is a flowchart showing an example of regeneration cooperative control permission and inhibition processing that is executed by the HVECU 70. The processing is executed repeatedly at every predetermined time (for example, every several tens of msec).

Figure 4:
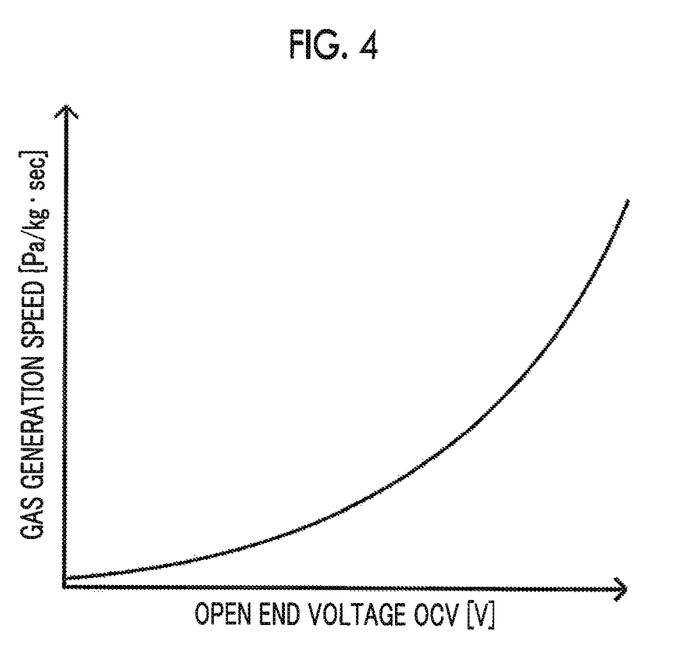
FIG. 4 is an explanatory view showing an example of the relationship between an open end voltage and a gas generation speed.

In a case where the regeneration cooperative control permission and inhibition processing is executed, the HVECU 70 first inputs the estimated cell open end voltage OCVc (Step S100), and determines whether or not the estimated cell open end voltage OCVc is equal to or greater than a threshold Vref (Step S110). For the estimated cell open end voltage OCVc, a value calculated by the battery ECU 52 is input through communication. The threshold Vref is set in advance as a voltage at which a gas generation speed in a cell is comparatively low when a charging voltage is applied to a cell of the battery 50, and can be defined by an experiment or the like. An example of the relationship between the open end voltage OCV and the gas generation speed is shown in FIG. 4. As shown in the drawing, the greater the open end voltage OCV, the higher the gas generation speed. In a case where the gas generation speed in the cell becomes high, internal pressure of the cell becomes high due to generated gas, and in a case where the internal pressure becomes higher than valve open pressure of a safety valve (not shown) attached to the battery 50, the safety valve is opened to decrease the pressure in the cell. In a case where the safety valve is opened, the electrical characteristics of the battery are degraded due to discharge of an electrolyte or the like. In the example, the threshold Vref is defined so as to correspond to a gas generation speed for the internal pressure at which the safety valve is not opened.

When determination is made that the estimated cell open end voltage OCVc is less than the threshold Vref, in order to permit the regeneration cooperative control as normal control, a value of 0 is set as a regeneration cooperative control permission and inhibition flag Fb (Step S120). Then, a normal value T1 is set as a rate value Tret in a case of replacing regenerative torque (braking torque) output from the motor MG2 by the hydraulic brake device 90 (Step S130), and the processing ends. While the regenerative torque (braking torque) output from the motor MG2 may be replaced by the hydraulic brake device 90 when the depression amount of the brake pedal 85 of the driver is changed or immediately before stopping, the rate value Tret is a rate value of rate limitation processing at this time. In a case where the rate value Tret is greater than the normal value, replacement is promptly performed, and in a case where the rate value Tret is smaller than the normal value, replacement is gradually performed.

In Step S110, when determination is made that the estimated cell open end voltage OCVc is equal to or greater than the threshold Vref, in order to inhibit the regeneration cooperative control, a value of 1 is set as the regeneration cooperative control permission and inhibition flag Fb (Step S140), a value T2 smaller than the normal value T1 is set as the rate value Tret in a case of replacing the regenerative torque (braking torque) output from the motor MG2 by the hydraulic brake device 90 (Step S150), and the processing ends. In a case where the regeneration cooperative control is inhibited, a value of 0 is set as the torque command Tm2* for braking of the motor MG2, and the entire target braking force Pb* is output from the hydraulic brake device 90. In addition, when the engine brake is performed, the engine brake may be inhibited, and braking force by the hydraulic brake device 90 may be increased by the inhibition amount. In a case where the value of 1 is set as the regeneration cooperative control permission and inhibition flag Fb when the driver depresses the brake pedal 85, while the regenerative torque (braking torque) output from the motor MG2 is replaced with braking force from the hydraulic brake device 90, since the value T2 smaller than the normal value T1 at this time is set as the rate value Tret, replacement is gradually performed. While there is a possibility that vibration occurs in the vehicle due to torque shock or the like in a case of replacing the regenerative torque (braking torque) output from the motor MG2 with braking force from the hydraulic brake device 90, since the rate value Tret that is the value T2 smaller than the normal value is used, it is possible to suppress the occurrence of vibration, and to suppress degradation of drivability.

In the hybrid vehicle 20 of the example described above, when the estimated cell open end voltage OCVc is equal to or greater than the threshold Vref set in advance as a voltage at which the gas generation speed in the cell is comparatively low, the value of 1 is set as the regeneration cooperative control permission and inhibition flag Fb to inhibit the regeneration cooperative control. With this, since the value of 0 is set as the torque command Tm2* for braking of the motor MG2 at the time of brake-on, it is possible to suppress the charging of the battery 50. That is, it is possible to suppress a situation in which the internal pressure in the cell of the battery 50 increases, the safety valve (not shown) is opened, and the electrical characteristics of the battery are degraded due to discharge of an electrolyte or the like. As a result, it is possible to suppress an increase in speed of the engine that may occur due to a decrease in the input limit Win of the battery 50. In addition, it is possible to suppress a situation in which the battery 50 is brought into an over-discharge state due to a decrease in the input limit Win of the battery 50, the output limit Wont of the battery 50 decreases, and smooth drive control cannot be performed. As a result, it is possible to suppress degradation of drivability.

In the hybrid vehicle 20 of the example, when the estimated cell open end voltage OCVc is equal to or greater than the threshold Vref, the value of 1 is set as the regeneration cooperative control permission and inhibition flag Fb to inhibit the regeneration cooperative control. However, when the estimated cell open end voltage OCVc is equal to or greater than the threshold Vref, the value of 1 may be set as the regeneration cooperative control permission and inhibition flag Fb to limit the regeneration cooperative control. As the limitation of the regeneration cooperative control, decreasing regenerative torque by the regenerative control of the motor MG2 and increasing braking force by the hydraulic brake device 90 by the decrease amount can be considered. In addition, when the engine brake is performed, decreasing the application of the engine brake and increasing the braking force by the hydraulic brake device 90 by the decrease amount may be considered.

Figure 5:
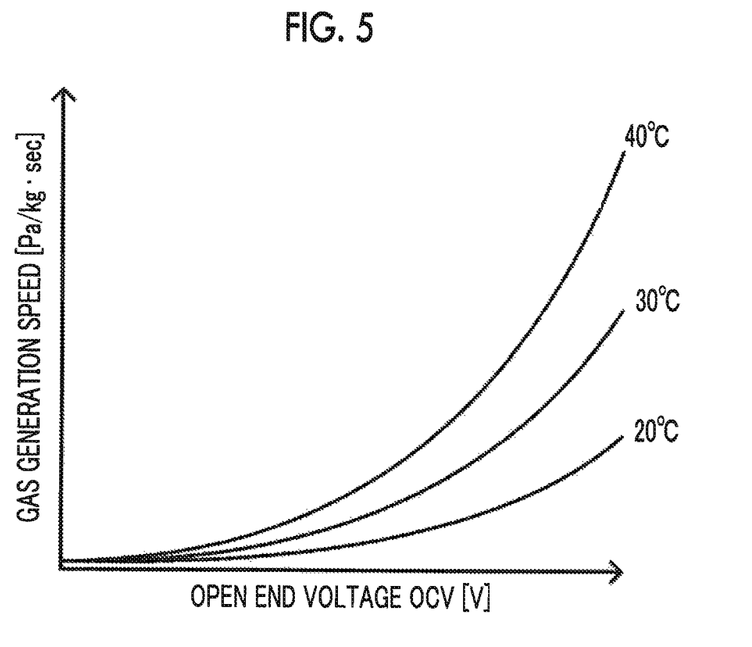
FIG. 5 is an explanatory view showing an example of the relationship of a temperature of a battery, the open end voltage, and the gas generation speed.

In the hybrid vehicle 20 of the example, when the estimated cell open end voltage OCVc is equal to or greater than the threshold Vref defined in advance, the value of 1 is set as the regeneration cooperative control permission and inhibition flag Fb to inhibit the regeneration cooperative control. However, the threshold Vref may be obtained as a smaller value when the temperature of the battery 50 is higher. An example of the relationship of the temperature of the battery 50, the open end voltage OCV, and the gas generation speed is shown in FIG. 5. As shown in the drawing, since the gas generation speed becomes higher when the temperature of the battery 50 is higher, the threshold Vref is set to be smaller when the temperature of the battery 50 is higher, and thus it is possible to more suitably inhibit or permit the regeneration cooperative control.

Figure 6:
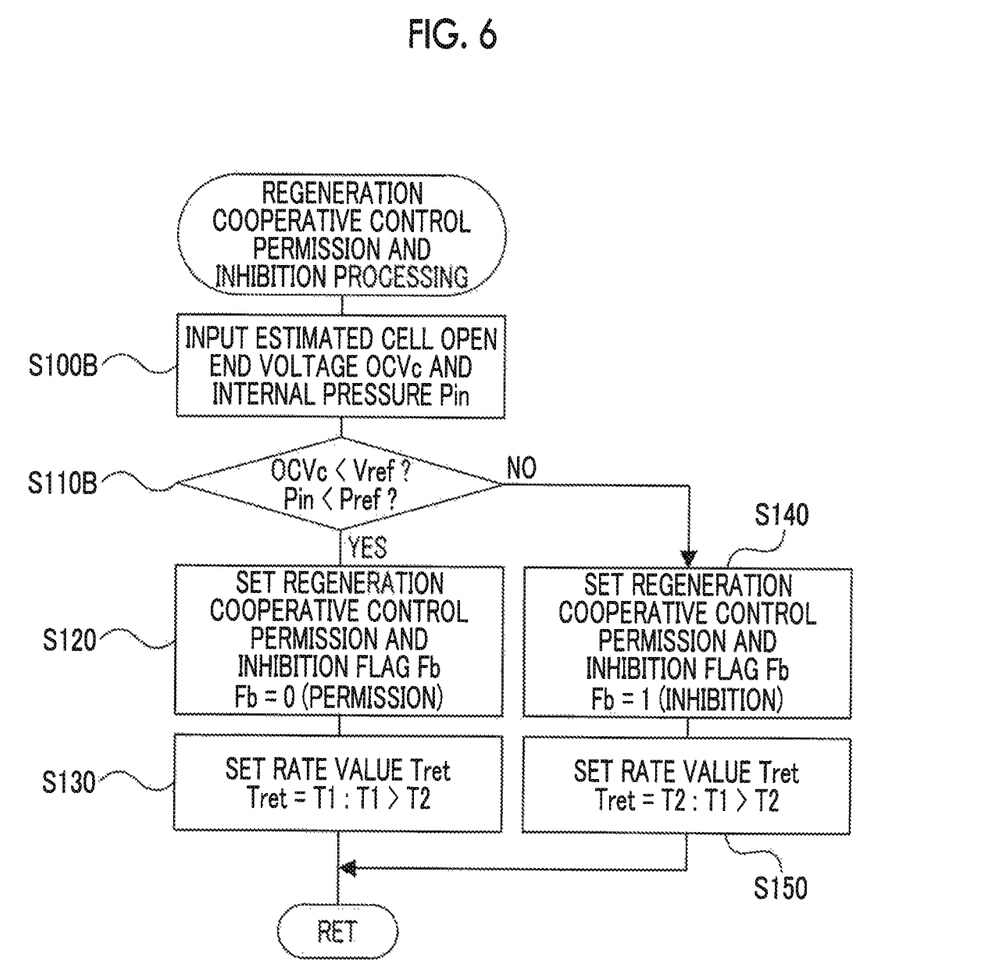
FIG. 6 is a flowchart showing an example of regeneration cooperative control permission and inhibition processing of a modification example.

In the hybrid vehicle 20 of the example, when the estimated cell open end voltage OCVc is equal to or greater than the threshold Vref, the value of 1 is set as the regeneration cooperative control permission and inhibition flag Fb to inhibit the regeneration cooperative control. However, the regeneration cooperative control may be inhibited in consideration of the internal pressure Pin of the cell of the battery 50 as well as the estimated cell open end voltage OCVc. In this case, regeneration cooperative control permission and inhibition processing illustrated in FIG. 6 may be executed. In a case where the regeneration cooperative control permission and inhibition processing of FIG. 6 is executed, the HVECU 70 first inputs the estimated cell open end voltage OCVc and the internal pressure Pin of the cell (Step S100B), and determines whether or not the estimated cell open end voltage OCVc is equal to or greater than the threshold Vref and the internal pressure Pin of the cell of the battery 50 is equal to or greater than a threshold Pref (Step S110B). For the internal pressure Pin, a pressure sensor may be attached to the cell of the battery 50 and a value from the pressure sensor may be used, or a value that is estimated by integrating a gas generation amount from the relationship between the estimated open end voltage OCV of the battery 50 and the gas generation speed may be used. The threshold Pref may be defined in advance as the pressure of the cell that is slightly lower than the valve open pressure of the safety valve (not shown) attached to the battery 50. When determination is made that the estimated cell open end voltage OCVc is less than the threshold Vref or determination is made that the internal pressure Pin of the cell of the battery 50 is less than the threshold Pref, in order to permit the regeneration cooperative control as the normal control, the value of 0 is set as the regeneration cooperative control permission and inhibition flag Fb (Step S120), the normal value T1 is set as the rate value Tret (Step S130), and the processing ends. When determination is made that the estimated cell open end voltage OCVc is equal to or greater than the threshold Vref and the internal pressure Pin of the cell of the battery 50 is equal to or greater than the threshold Pref, in order to inhibit the regeneration cooperative control, the value of 1 is set as the regeneration cooperative control permission and inhibition flag Fb (Step S140), the value T2 smaller than the normal value T1 is set as the rate value Tret (Step S150), and the processing ends. In such a modification example, it is possible to obtain the same effects as in the example, that is, an effect capable of suppressing an increase in speed of the engine and an effect capable of suppressing a situation in which smooth drive control cannot be performed, and as a result, to suppress degradation of drivability.

Figure 7:
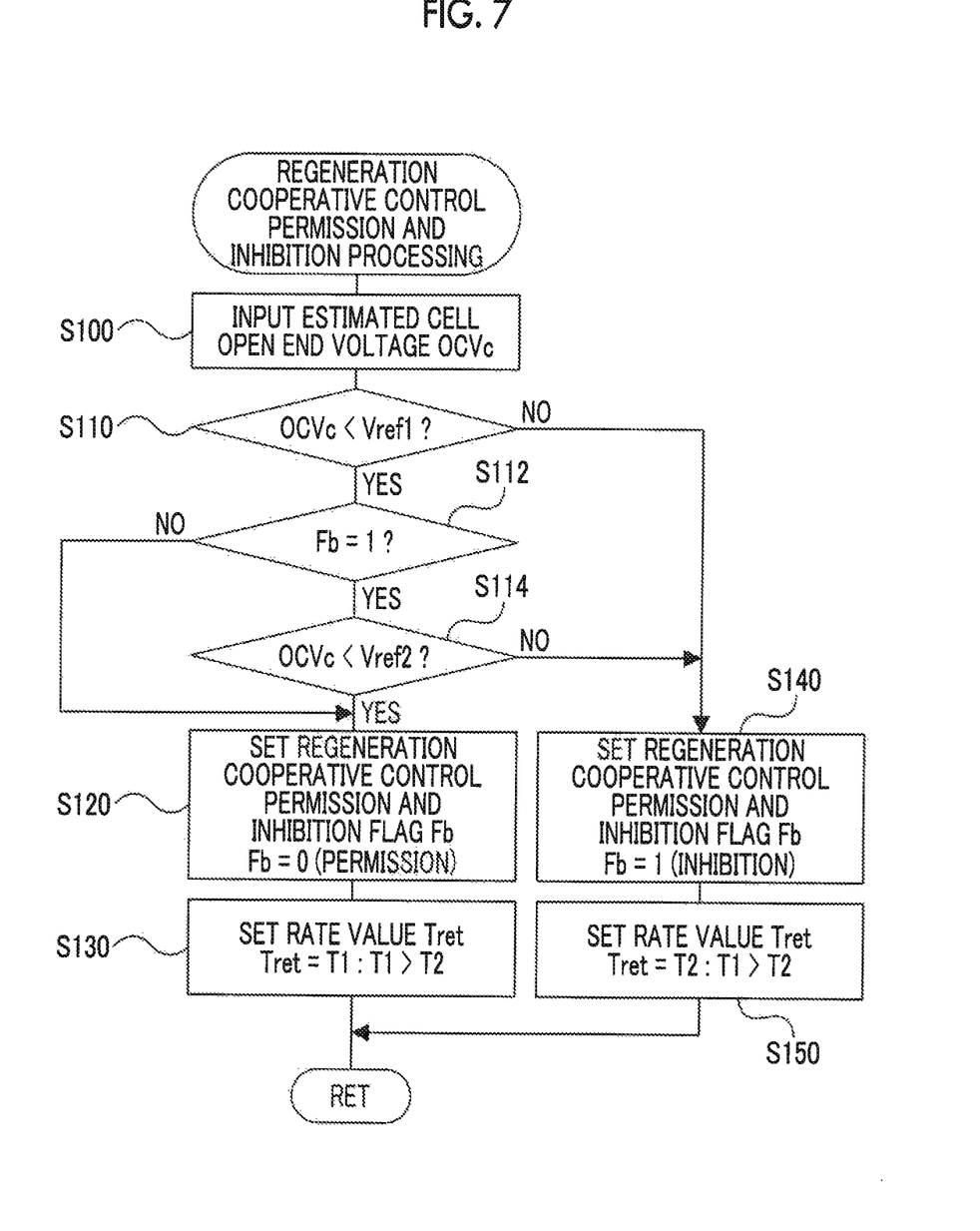
FIG. 7 is a flowchart showing an example of regeneration cooperative control permission and inhibition processing of a modification example.

In the hybrid vehicle 20 of the example, when the estimated cell open end voltage OCVc is equal to or greater than the threshold Vref, the value of 1 is set as the regeneration cooperative control permission and inhibition flag Fb to inhibit the regeneration cooperative control, and when the estimated cell open end voltage OCVc is less than the threshold Vref, the value of 0 is set as the regeneration cooperative control permission and inhibition flag Fb to permit the regeneration cooperative control. However, the regeneration cooperative control permission and inhibition flag Fb may be set with a hysteresis such that the inhibition and permission of the regeneration cooperative control are not frequently repeated. In this case, regeneration cooperative control permission and inhibition processing illustrated in FIG. 7 may be executed. In a case where the regeneration cooperative control permission and inhibition processing of FIG. 7 may be executed, the HVECU 70 first inputs the estimated cell open end voltage OCVc (Step S100), and determines whether or not the estimated cell open end voltage OCVc is equal to or greater than a threshold Vref1 (Step S110). The threshold Vref1 is the same as the threshold Vref of the example. When determination is made that the estimated cell open end voltage OCVc is equal to or greater than the threshold Vref1, the value of 1 is set as the regeneration cooperative control permission and inhibition flag Fb to inhibit the regeneration cooperative control (Step S140), the value T2 is set as the rate value Tret (Step S150), and the processing ends. In Step S110, when determination is made that the estimated cell open end voltage OCVc is less than the threshold Vref1, examination is made whether or not the regeneration cooperative control permission and inhibition flag Fb is the value of 1 (Step S112), when the regeneration cooperative control permission and inhibition flag Fb is the value of 0, the value of 0 of the regeneration cooperative control permission and inhibition flag Fb and the value T1 of the rate value Tret are continued (Steps S120 and S130), and the processing ends. In Step S112, when determination is made that the regeneration cooperative control permission and inhibition flag Fb is the value of 1, determination is made whether or not the estimated cell open end voltage OCVc is less than a threshold Vref2 smaller than the threshold Vref1 (Step S114). When determination is made that the estimated cell open end voltage OCVc is equal to or greater than the threshold Vref2, the value of 1 of the regeneration cooperative control permission and inhibition flag Fb and the value T2 of the rate value Tret are continued (Steps S140 and S150), and the processing ends. In Step S114, when determination is made that the estimated cell open end voltage OCVc is less than the threshold Vref2, the value of 0 is set as the regeneration cooperative control permission and inhibition flag Fb to release the inhibition of the regeneration cooperative control (Step S120), the normal value T1 is set as the rate value Tret (Step S130), and the processing ends. In this way, the inhibition and release of the regeneration cooperative control are set with the hysteresis, and thus it is possible to suppress frequent repetition of the inhibition and permission of the regeneration cooperative control.

Figure 8:
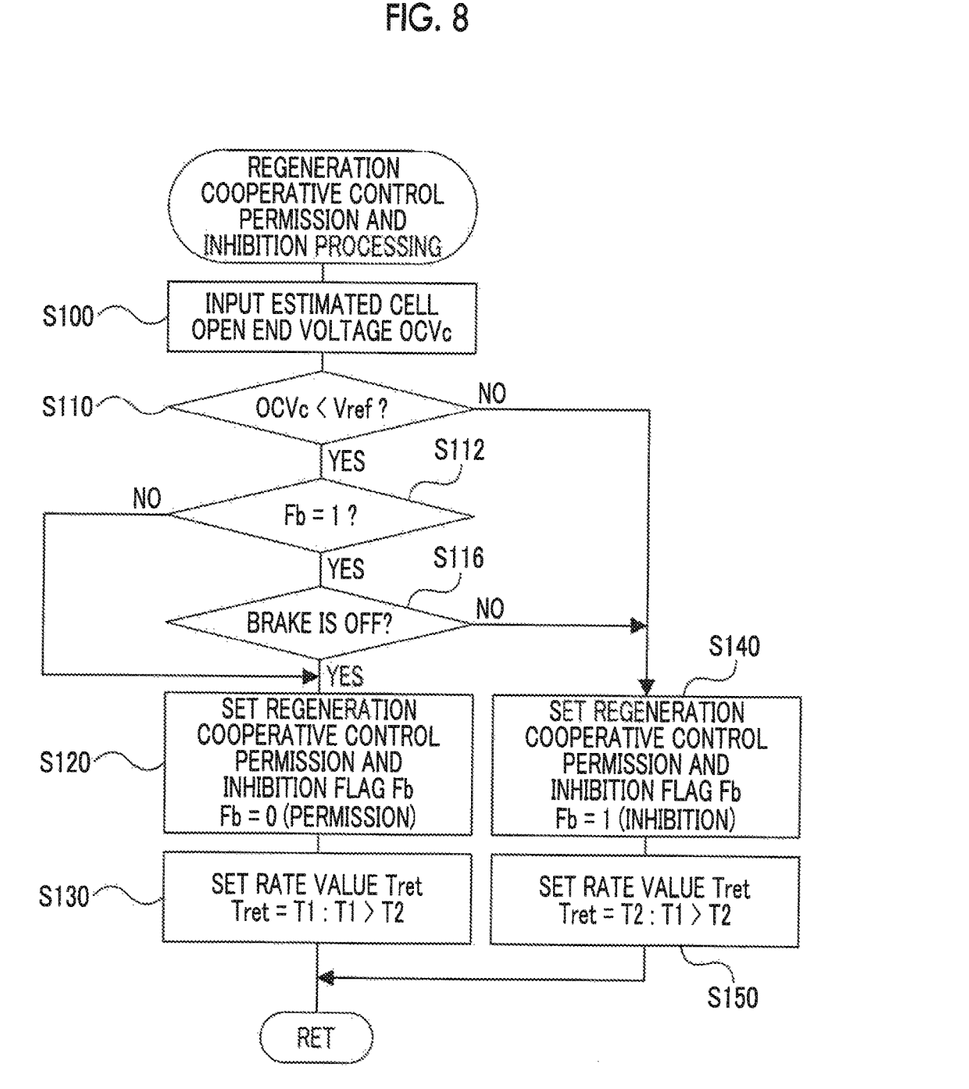
FIG. 8 is a flowchart showing an example of regeneration cooperative control permission and inhibition processing of a modification example.

In the hybrid vehicle 20 of the example, when the estimated cell open end voltage OCVc is equal to or greater than the threshold Vref, the value of 1 is set as the regeneration cooperative control permission and inhibition flag Fb to inhibit the regeneration cooperative control, and when the estimated cell open end voltage OCVc is less than the threshold Vref, the value of 0 is set as the regeneration cooperative control permission and inhibition flag Fb to permit the regeneration cooperative control. However, the inhibition of the regeneration cooperative control may be released at the time of brake-off. In this case, regeneration cooperative control permission and inhibition processing illustrated in FIG. 8 may be executed. In a case where the regeneration cooperative control permission and inhibition processing of FIG. 8 is executed, the HVECU 70 first inputs the estimated cell open end voltage OCVc (Step S100), and determines whether or not the estimated cell open end voltage OCVc is equal to or greater than the threshold Vref (Step S110). When determination is made that the estimated cell open end voltage OCVc is equal to or greater than the threshold Vref, the value of 1 is set as the regeneration cooperative control permission and inhibition flag Fb to inhibit the regeneration cooperative control (Step S140), the value T2 is set as the rate value Tret (Step S150), and the processing ends. In Step S110, when determination is made that the estimated cell open end voltage OCVc is less than the threshold Vref, examination is made whether or not the regeneration cooperative control permission and inhibition flag Fb is the value of 1 (Step S112), when the regeneration cooperative control permission and inhibition flag Fb is the value of 0, the value of 0 of the regeneration cooperative control permission and inhibition flag Fb and the value T1 of the rate value Tret are continued (Steps S120 and S130), and the processing ends. In Step S112, when determination is made that the regeneration cooperative control permission and inhibition flag Fb is the value of 1, determination is made whether or not the brake is off (Step S116). When determination is made that the brake is not off (the brake is on), the value of 1 of the regeneration cooperative control permission and inhibition flag Fb and the value T2 of the rate value Tret are continued (Steps S140 and S150), and the processing ends. In Step S116, when determination is made that the brake is off, the value of 0 is set as the regeneration cooperative control permission and inhibition flag Fb to release the inhibition of the regeneration cooperative control (Step S120), the normal value T1 is set as the rate value Tret (Step S130), and the processing ends. In this way, the inhibition of the regeneration cooperative control is released at the time of brake-off, and thus it is possible to suppress frequent repetition of the inhibition and permission of the regeneration cooperative control.

Figure 9:
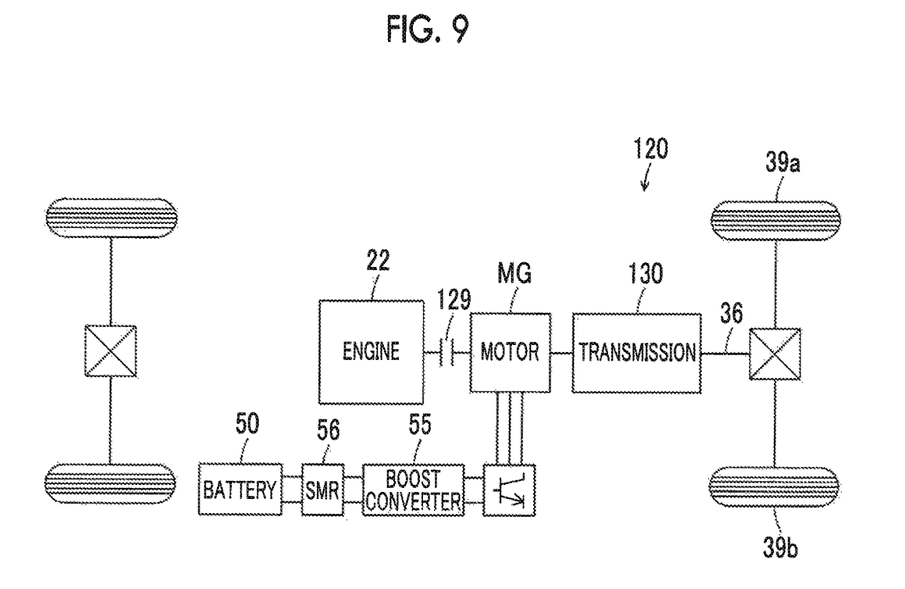
FIG. 9 is a configuration diagram showing the outline of the configuration of a hybrid vehicle of a modification example.
Figure 10:
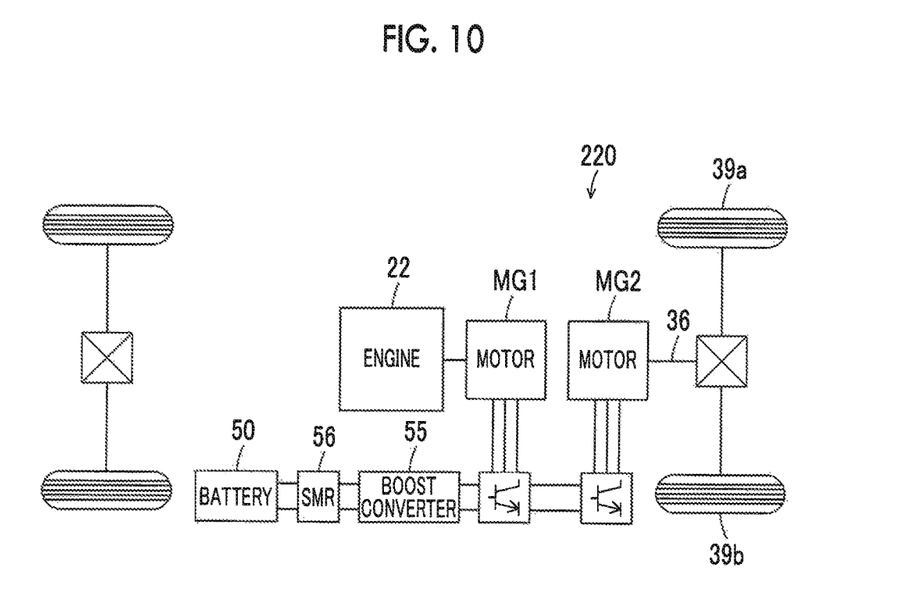
FIG. 10 is a configuration diagram showing the outline of the configuration of a hybrid vehicle of a modification example.

In the hybrid vehicle 20 of the example, a configuration is made in which the engine 22 and the motor MG1 are connected to the drive shaft 36 coupled to the drive wheels 39a, 39b through the planetary gear 30, and the motor MG2 is connected to the drive shaft 36. However, as shown in a hybrid vehicle 120 of a modification example of FIG. 9, a configuration may be made in which a motor MG is connected to the drive shaft 36 coupled to the drive wheels 39a, 39b through a transmission 130, and the engine 22 is connected to a rotational shaft of the motor MG through a clutch 129. As shown in a hybrid vehicle 220 of a modification example of FIG. 10, a so-called series hybrid vehicle configuration may be made in which a motor MG2 for traveling is connected to the drive shaft 36 coupled to the drive wheels 39a, 39b, and a motor MG1 for electric power generation is connected to an output shaft of the engine 22. A configuration may be made in which the boost converter 55 is not provided.

The correspondence relationship between the primary components of the example and the primary components described in "SUMMARY" will be described. In the example, the engine 22 corresponds to an "engine", the motor MG2 corresponds to an "electric motor", the battery 50 corresponds to a "battery", the hydraulic brake device 90 corresponds to a "hydraulic brake", and the HVECU 70, the engine ECU 24, the motor ECU 40, the battery ECU 52, and the brake ECU 98 correspond to an "electronic control unit".

The correspondence relationship between the primary components of the example and the primary components described in "SUMMARY" should not be considered to limit the components described in "SUMMARY" since the example is merely illustrative to specifically describe the aspects described in "SUMMARY", That is, the components described in "SUMMARY" should be interpreted based on the description in "SUMMARY", and the example is merely a specific example described in "SUMMARY".

Although the mode for carrying out the embodiment has been described above in connection with the example, the disclosure is not limited to the example, and can certainly be carried out in various forms.

The embodiment is usable in a manufacturing industry of a hybrid vehicle, or the like.

What is claimed is:

1. A hybrid vehicle comprising:
an engine;
an electric motor configured to give braking force to the vehicle;
a battery configured to exchange electric power with the electric motor;
a hydraulic brake configured to give braking force to the vehicle; and
an electronic control unit configured to execute regeneration cooperative control such that braking force is given from the engine, the electric motor, or the hydraulic brake to the vehicle based on a driver's brake-on operation, the electronic control unit being configured to limit the regeneration cooperative control when an open end voltage of the battery is equal to or greater than a first predetermined voltage.

2. The hybrid vehicle according to claim 1, wherein the electronic control unit is configured to inhibit the regeneration cooperative control as limitation of the regeneration cooperative control.

3. The hybrid vehicle according to claim 1, wherein the electronic control unit is configured to release limitation of the regeneration cooperative control after the open end voltage becomes less than a second predetermined voltage lower than the first predetermined voltage when the regeneration cooperative control is limited.

4. The hybrid vehicle according to claim 1, wherein the electronic control unit is configured to release limitation of the regeneration cooperative control after brake-off, when releasing the limitation of the regeneration cooperative control.

5. The hybrid vehicle according to claim 1, wherein the first predetermined voltage has a smaller value when a temperature of the battery is higher.

6. The hybrid vehicle according to claim 1, wherein the electronic control unit is configured to limit the regeneration cooperative control when the open end voltage becomes equal to or greater than the first predetermined voltage and internal pressure of the battery is equal to or greater than predetermined internal pressure.

7. The hybrid vehicle according to claim 1, wherein the electronic control unit is configured to decrease another braking force according to an increase rate in braking force of the hydraulic brake in a case of limiting the regeneration cooperative control.

8. The hybrid vehicle according to claim 1, wherein the electronic control unit is configured to limit the regeneration cooperative control by performing switching of braking force to the vehicle such that the braking force given by the electric motor decreases and the braking force given by the hydraulic brake increases by a decrease amount of the braking force given by the electric motor.

9. The hybrid vehicle according to claim 8, wherein the electronic control unit is configured to, in a case where the regeneration cooperative control is limited, set a rate of switching the braking force to be lower than in a case where the regeneration cooperative control is not limited.

10. The hybrid vehicle according to claim 1, wherein the electronic control unit is configured to limit the regeneration cooperative control by performing switching of braking force to the vehicle such that the braking force given by an engine brake of the engine decreases and the braking force given by the hydraulic brake increases by a decrease amount of the braking force given by the engine brake.

11. The hybrid vehicle according to claim 10, wherein the electronic control unit is configured to, in a case where the regeneration cooperative control is limited, set a rate of switching the braking force to be lower than in a case where the regeneration cooperative control is not limited.

12. The hybrid vehicle according to claim 1, wherein the electronic control unit is configured to perform the regeneration cooperative control by cooperatively applying an engine brake, regenerative torque by regenerative control of the electric motor, and braking force by the hydraulic brake.

* * * * *